(12) United States Patent
David et al.

(10) Patent No.: US 7,269,532 B2
(45) Date of Patent: Sep. 11, 2007

(54) DEVICE AND METHOD FOR MEASURING ORIENTATION OF A SOLID WITH MEASUREMENT CORRECTION MEANS

(75) Inventors: Dominique David, Claix (FR); Yanis Caritu, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/509,987

(22) PCT Filed: Apr. 2, 2003

(86) PCT No.: PCT/FR03/01025

§ 371 (c)(1),
(2), (4) Date: Sep. 30, 2004

(87) PCT Pub. No.: WO03/085357

PCT Pub. Date: Oct. 16, 2003

(65) Prior Publication Data

US 2005/0125191 A1    Jun. 9, 2005

(30) Foreign Application Priority Data

Apr. 5, 2002 (FR) .................................. 02 04260

(51) Int. Cl.
*G01C 19/00* (2006.01)
(52) U.S. Cl. ...................... 702/151; 702/141
(58) Field of Classification Search .................. 702/151
See application file for complete search history.

(56) References Cited

U.S. PATENT DOCUMENTS

| | | | | |
|---|---|---|---|---|
| 4,686,771 A * | 8/1987 | Beveventano et al. | ........ | 33/324 |
| 5,179,525 A * | 1/1993 | Griffis et al. | ................... | 703/1 |
| 5,526,022 A * | 6/1996 | Donahue et al. | ............ | 345/156 |
| 5,645,077 A * | 7/1997 | Foxlin | ......................... | 600/587 |
| 5,682,317 A * | 10/1997 | Keeler et al. | ................ | 701/101 |
| 5,953,683 A | 9/1999 | Vladimir et al. | | |
| 6,208,936 B1 | 3/2001 | Minor et al. | | |
| 6,636,826 B1 * | 10/2003 | Abe et al. | ................... | 702/151 |
| 6,702,708 B2 | 3/2004 | Goto et al. | | |

FOREIGN PATENT DOCUMENTS

| | | |
|---|---|---|
| DE | 34 46 658 | 11/1988 |
| EP | 0 646 696 | 9/1994 |
| WO | 00/36376 | 6/2000 |

OTHER PUBLICATIONS

Nougier, J. P., "Methode de Calcul Numerique", 1987, 3rd Edition, pp. 54-58.
Townsend, et al., "A Miniatrue, Sourceless, Networked, Solid State Orientation Module", MicroStrain, Inc., Burlington, VT, pp. 44-50.

* cited by examiner

*Primary Examiner*—Bryan Bui
*Assistant Examiner*—Jonathan Moffat
(74) *Attorney, Agent, or Firm*—Thelen Reid Brown Raysman & Steiner LLP

(57) ABSTRACT

The present invention relates to a device for detecting the orientation of a solid including a sensor of angular position, capable of being affixed to the solid and of supplying at least a measuring datum representative of the orientation of the solid. The device also includes means for generating test data representative of an estimated orientation of the solid, and means for modification of the estimated orientation of the solid by confrontation of the measuring datum and test data.

17 Claims, 1 Drawing Sheet

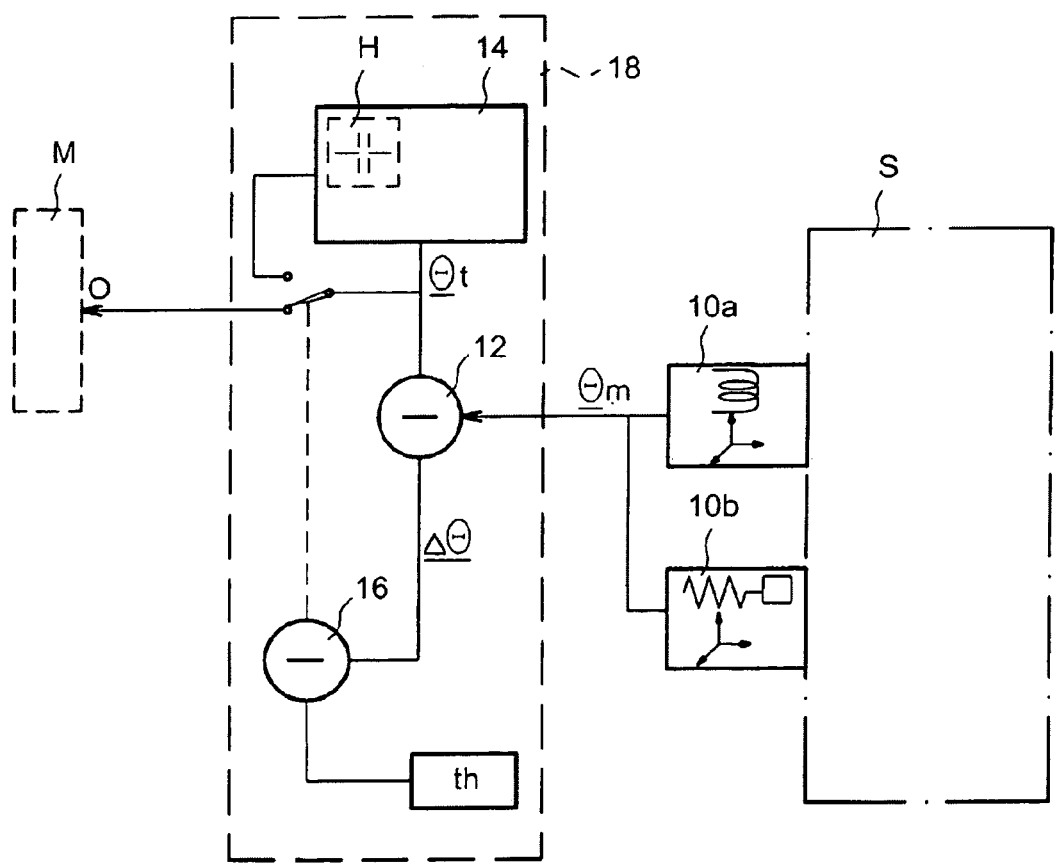

DEVICE AND METHOD FOR MEASURING ORIENTATION OF A SOLID WITH MEASUREMENT CORRECTION MEANS

CROSS-REFERENCE TO RELATED APPLICATION

This application claims priority based on International Patent Application No. PCT/FR03/01025, entitled "Device for Rotational Motion Capture of a Solid" by Dominique David and Yanis Caritu, which claims priority of French Application No. 02/04260, filed on Apr. 5, 2002, and which was not published in English.

TECHNICAL FIELD

The present invention concerns a device and a process for sensing the orientation and the rotational motion of a solid. The devices for sensing motion, sometimes designated by mocap (motion capture) are applied in fields as varied as health, multimedia, mining or geophysical research.

In the field of application of video games or simulations, the motions of a user can in effect be registered for controlling virtual reality immersion systems. By way of example, the motions of a player can be registered to control the evolution of a virtual person in a synthesis scene.

In the field of health, the motion capture devices can be utilised for positioning a surgical instrument or else for monitoring the evolution of the autonomy of fragile persons by taking their physical activity into account.

In the field of portable electronics, the motion capture devices allow apparatus to adapt to the context of utilisation. They allow, for example, optimising of reception, of a portable telephone by recognising its orientation, or improving the interfaces of personal assistants.

PRIOR ART

Motion sensors, and more precisely angular position sensors, are greatly miniaturised and are the focus of research to impart them with a robustness and cost compatible with applications for the public at large.

The position of a solid in space is entirely determined by the knowledge of six magnitudes. Examples of these are three magnitudes capable of translating translations and three other magnitudes capable of translating rotations. The three latter magnitudes correspond to angular positions. These can be utilised to determine motions known as skew motion, pitch motion and roll motion.

According to the envisaged applications it is not always necessary to place all six associated magnitudes at six degrees of liberty. A more restrained number of data can in effect suffice in a large number of cases.

Two types of sensors are mainly known which are capable of detecting the angular position or the rotation of a solid. These are on the one hand sensors sensitive to a magnetic field, such as magnetometers, and on the other hand sensors sensitive to acceleration, such as accelerometers. In an advantageous manner the accelerometers can measure any accelerations of the solid, thus for example, modifications of the orientation of the solid relative to the direction of the field of terrestrial gravity.

The magnetometers can be utilised in combination with an artificial source of magnetic field. All the same it is preferred to make use of magnetometers capable of detecting the orientation of the solid relative to the terrestrial magnetic field. It is considered of course that the directions of the magnetic field and of the acceleration of the apparent gravity are not colinear.

The sensors can be of the type having a single axis, that is, sensitive according to a single direction unique of space. However, sensors having two or three non-parallel axes are preferred. These supply measuring values allowing an angular position of a solid to which they are solid to be recognised completely.

The sensors supply a measuring signal M which is connected to their inclination I by a function f such as:

$$M=f(I).$$

The inclination is considered relative here to an angular reference position. The latter can be arbitrary or adjusted on the magnetic field or the terrestrial gravitational field. The magnitude to be known is the inclination I, which can be retrieved by calculation according to a formula $I=f^{-1}(M)$.

The inverse function $f^{-1}$ is however difficult to establish with exactitude. In addition, it suffers from discontinuities and non-linearities. A difficulty is attached for example to the fact that the sensors using the field of apparent gravity do allow rotations to be found at any instant about horizontal axes but not about the direction of apparent gravity. The same applies to magnetometers which are efficacious only for measuring rotations whereof the axis is not confused with the direction of the magnetic field used as reference. Non-linearities also originate from trigonometric functions brought up by calculating the inverse function.

Additional inaccuracies originate from the fact that the sensors having three axes do not always have a very precise angular relation between the axes. For example, the axes are not exactly orthogonal.

An illustration of the state of the art can still be found in the documents (1) to (4) whereof the references are specified at the end of the present description.

EXPLANATION OF THE INVENTION

The aim of the invention is to propose a device and a capture process of the orientation of a solid not having the abovementioned limitations and difficulties.

An aim in particular is to propose such a device which is low in cost and capable of being integrated into equipment destined for a wide public.

Another aim is to propose a reliable device, little sensitive to phenomena of non-linearity affecting measurements, and allowing possible imperfections in the sensors to be taken into account directly.

To attain these aims the invention more precisely concerns a capture device of the orientation of a solid comprising:

at least one angular position sensor capable of being made solid with the solid and of providing at least one measuring datum representative of the orientation of the solid, means for generating test data representative of estimated orientation of the solid, means for modification of the estimated orientation of the solid by confrontation of the measuring datum and test data.

In the following description reference is made to the orientation of a solid. The solid does not however form part of the capture device.

The orientation corresponds more precisely to that of the sensor or sensors capable of being fixed to the solid. Furthermore, the terms orientation and angular position are utilised as synonyms. Owing to the inventive device it is possible to successively refine estimation of the orientation of the solid.

After one or more modifications of the estimated orientation, the latter converges towards effective orientation of the solid, or, more precisely, towards measured orientation. Therefore, the inventive device does not require calculation means to establish the orientation or the inclination of the solid on the base of a function (inverse) of the measuring data of the sensors.

The inventive device allows the imperfections of the sensors to be taken directly into account and allows non-linear behaviours of the latter to be set free. By way of example, utilisation of sensors with three sensitive non-orthogonal axes is possible.

According to a particular realisation of the device, the modification means of the estimated orientation can comprise a first comparator connected on one side to the sensor and on the other side to the test data generator means. The first comparator thus receives the measuring datum and a test datum, and can establish at least one difference between the test datum and the measuring datum.

The difference between the test datum and the measuring datum constitutes measuring the pertinence of the estimated orientation.

The correlation between the estimated orientation and the test datum generated can be given, for example, by a direct function f as evoked in the introductory section of the description. This is, for example, a simple function of modelling of the behaviour of the sensors.

The difference between each of the successive test data and the measuring datum can also be put to profit to control the necessity or not of further refining the estimated orientation. Accordingly, the device can comprise a second comparator with threshold for comparing the difference established by the first comparator with a threshold value and for validating the estimated orientation, when the difference established by the first comparator for a given test value is less than the threshold value.

When the difference remains too significant a new estimation of the orientation is undertaken.

The modification means of the estimated orientation and/or the generator means of a test datum can comprise a calculator for establishing a new estimated orientation and/or a new test datum according to a method known as descent of error gradient.

Furthermore, the generator means of test data can comprise a calculator for calculating test data as a function of estimated orientation, and as a function of parameters characteristic of a response of the angular position sensor.

The inventive device can comprise one or more angular position sensors sensitive to gravity and one or more angular position sensors sensitive to a magnetic field.

In a more general sense other sensors are capable of giving information on their angular position relative to a reference direction of space.

For example, there are sensors for measuring a temperature gradient, a pressure gradient, image sensors (visible or thermal).

By way of example, the sensor sensitive to gravity can comprise at least one accelerometer and the sensor sensitive to a magnetic field can comprise at least one magnetometer.

In order to measure the angular position in the most complete manner and the best determined, the device is preferably equipped with two sensors each having three axes of sensitivity.

The invention also concerns a capture device of the rotation motion of a solid comprising an orientation capture device such as described hereinabove and means for registering successive estimations of the orientation of the solid. This is, for example, a memory. The device can also comprise a timer for rating the registration of the successive estimations of the orientation of the solid. The timer also allows speeds and angular accelerations to be established, if necessary.

Calculating the motion can take place in the calculator and according to classic laws of kinetics of a solid.

The invention further relates to a process for estimating the orientation of a solid comprising the following stages:

a) input of at least one measuring datum originating from at least one angular position sensor and the establishment of at least one test datum representative of an estimated orientation of the sensor, b) confrontation of the test datum and of the measured datum, c) establishment of at least a new test datum representative of a new estimated orientation of the solid, corrected as a function of the preceding confrontation, d) repetition of stages b) et c).

Stages b) and c) can be repeated until the confrontation reveals a difference between the test datum and the measuring datum less than a determined threshold.

The confrontation of the data can comprise their comparison or the calculation of a difference, as shown hereinabove.

The invention differs from the devices of the prior art by the fact that the determination of the orientation is not necessarily done in constant time. In the devices of the prior art, the determination of the orientation is effected in a fixed time corresponding to the necessary calculation time. In the case of iterative confrontation such as indicated hereinabove, the time taken by the determination of the orientation is, for example, associated with pertinence of the initial estimation of the orientation and the speed of convergence of successive estimations. In other terms, the time given for determining the orientation depends on the number of repetitions of stages b) and c). The processing time does not however constitute an obstacle for implementing the process. In fact the real measurements made are of the order of 500 per sensor and per second. It is thus possible to effect several estimation loops for each measurement. The number of loops is generally less than 30. Often, a few loops suffice.

As indicated hereinabove, during stage c), a correlation calculation can be made according to a method of error gradient descent. Even though this constitutes a less preferable solution it is still possible to make random estimations.

Other characteristics and advantages of the invention will emerge from the following description, in reference to the figure of the attached diagram.

This description is given purely by way of illustration and not limiting.

DETAILED DESCRIPTION OF AN EMBODIMENT OF THE INVENTION

The references 10a and 10b indicate respectively an accelerometer and a magnetometer. These are sensors with three axes of sensitivity, of known type, capable of providing measuring data representative of the orientation, that is, an angular position, of a solid S. The solid S is indicated summarily by broken lines. This is for example a part of the human body, the motions of which are to be studied, a computer mouse, a surgical instrument.

The measurements of the sensors, designated $\theta_m$, are of scalar or vectorial magnitudes. They are representative, for example, of angles of skew, roll and pitch ($\phi$, $\psi$, $\theta$).

These measurements are directed towards a comparator 12. This is, in the example illustrated, a differentiator. The comparator 12 also receives one or more test data $\theta_t$ provided by a calculator 14. The test datum can be vectorial in type and can express angles according to several axes. The calculator 14 is utilised as means for generating test data. The test data are representative of an estimated orientation of the solid which can be random or not. These are, for example, triplets of angles of skew, roll and pitch ($\phi$, $\psi$, $\theta$). The calculator can be localised on the solid S.

The comparator provides a difference $\Delta\Theta$, which, according to one or more axes, represents a spread between the real orientation, corresponding to the measuring datum, and the estimated orientation corresponding to the test datum. This spread can be used to refine the estimated orientation of the sensor, and thus of the solid to which it is fixed.

Nevertheless, it is possible to fix a threshold beyond which it is considered that the estimated orientation is sufficiently close to the orientation measured to be validated. This can take place by means of a second comparator 16 provided to compare the difference $\Delta\Theta$ with the threshold value.

When the difference is less than the threshold in absolute value the test datum $\theta_t$, that is, the estimation of the angular position, is directed towards an output O.

However, when the difference is greater than the threshold, it is directed towards the calculator 14 to effect a new estimation of the position. The comparators 12 and 16 thus constitute with the calculator 14 means 18 for modification of the estimated orientation of the solid S.

The new estimation can be random. It can also be refined according to a correction calculation by the error gradient descent method. This method, known per se, is illustrated by the document (4) whereof the coordinates are specified at the end of the description and to which reference can be made to complete the explanation.

The second comparator can optionally be eliminated. In this case, the estimated value is continually refined until the input of a new measurement value.

The device of the figure comprises means, for example a memory, for registering the successive estimated values, validated, as a function of successive measurements of the angular position of the solid. The memory M can be part of the calculator and can be localised on the solid S. The successive values enable calculation of the motion of rotation of the solid as well as its speeds and angular accelerations. To start the measuring of a new orientation of the solid, the first test datum generated is advantageously the validated estimated value of the preceding position.

The capture of measurement values by the sensors, and the registering of the estimated values in the memory M, can be rated by a timer H.

Contrary to the process of the known type of direct inversion, the capture process of the orientation of a solid according to the invention allows utilisation of any number of sensors, provided that this number is greater than the number of variables of angle I to be estimated (the number of variables of angle I to be estimated is between 1 and 3). According to the desired quality of the estimation, a device according to the invention can thus comprise the minimal number of sensors necessary or a number of sensors greater than the minimal number (redundancy).

According to a refinement of the invention, the contribution of each sensor can be weighted. A criterion of confidence or weight Cm is then established which is associated with each constituent of the measurement $\Theta$m in order to take the latter more or less into account in the algorithm of angles research. The calculation of a weight Cm is established according to the following rules:
  a) the weight Cm has a value equal to 1 by default,
  b) the weight Cm takes the value 0 in the event where the provided measurement is an aberrant value (saturation, value translating bad functioning, etc.),
  c) the weight Cm has a value equal to 0 when the level of noise measured by the sensor exceeds a certain threshold, an intermediate value varying linearly from 0 to 1 able to be applied for noise values varying from the threshold value to a noise value considered as negligible,
  d) the confidence is reduced on the accelerometers if the total acceleration measured moves away in standard from the value of apparent gravity,
  e) the confidence is reduced on the magnetometers if the magnetometers register an excessive variation in their standard (the presence of a ferromagnetic object(s) in the vicinity of the sensor can then be suspected).

In the absence of weighting, for iteration done by the calculator 14, the modification of a test angle I is associated with the magnitude $S_I$ such as:

$$S_I = \sum_{n=1}^{N} (\alpha_{In}\Delta\Theta_n),$$

n is the index of a sensor,
N is the number of sensors,
$\alpha_{In}$ is a parameter relative to the index sensor n, calculated usually by the gradient descent,
$\Delta\Theta_n$ is the spread between the real orientation and the estimated orientation of the index sensor n.

The introduction of a weight $Cm_n$ relative to the index sensor n then modifies the expression of the magnitude $S_I$ as follows:

$$S_I = \sum_{n=1}^{N} Cm_n(\alpha_{In}\Delta\Theta_n)$$

In general, the values of a weight $Cm_n$ can evolve continuously between the value 1 (total confidence in the measurement made by the index sensor n) and the value 0 (total absence of confidence in the measurement made by the index sensor n, the measurement made by the index sensor n is not taken into consideration).

The invention claimed is:
1. Capture device of the orientation of a solid comprising:
  a sensor of angular position, capable of being affixed to the solid and of supplying at least a measuring datum representative of the orientation of the solid, wherein the sensor of angular position being sensitive to at least one of gravity or a magnetic field;
  calculation means for generating test data representative of a random estimated orientation of the solid; and
  means for modifying the random estimated orientation of the solid by confrontation of the solid orientation that the measuring datum represents and test data.

2. Device as claimed in claim 1, wherein the modification means of the random estimated orientation comprise a first comparator connected to the sensor and to the calculation means for generating test data, for receiving the measuring datum and at least a test datum, and for establishing at least a difference between the test datum and the solid orientation that the measuring datum represents.

3. Device as claimed in claim 2, further comprising a second comparator with a threshold for comparing the difference established by the first comparator to a threshold value and to validate the random estimated orientation, when the difference established by the first comparator is less than the threshold value.

4. Device as claimed in claim 1, wherein the sensor sensitive to gravity comprises at least an accelerometer and the sensor sensitive to a magnetic field comprises at least a magnetometer.

5. Device as claimed in claim 1, comprising two sensors each having three axes of sensitivity.

6. Device as claimed in claim 1, wherein the calculation means for generating test data comprise a calculator for calculating test data as a function of parameters characteristic of a response of the angular position sensor.

7. Device as claimed in claim 6, wherein the calculator is localised on the solid.

8. Device as claimed in claim 1, wherein the modification means of the random estimated orientation and/or the calculation means for generating a test datum comprise a calculator for establishing a new estimated orientation and/or a new test datum according to an error gradient descent method.

9. Device as claimed in claim 8, wherein the calculator is localised on the solid.

10. Device as claimed in claim 1 further comprising means for registering successive estimations of the orientation of the solid.

11. Device as claimed in claim 10, wherein the means for registering are localised on the solid.

12. Device as claimed in claim 10, comprising a timer for rating registration of the successive estimations of the orientation of the solid.

13. A process for estimation of the orientation of a solid comprising:
   a) capture of measuring data originating from at least one angular position sensor and the establishment of a test datum representative of a random estimated orientation of the solid, the sensor of angular position being sensitive to at least one of gravity or a magnetic field;
   b) confrontation of the test datum and the solid orientation that the measured datum represents; and
   c) establishment of a new test datum representative of a new estimated orientation of the solid, corrected as a function of the preceding confrontation.

14. Process as claimed in claim 13, wherein the capture of measuring data and the confrontation of the test datum are repeated until the confrontation reveals a difference between the test datum and the measuring datum less than a determined threshold.

15. Process as claimed in claim 13, wherein, correction calculation is made according to a error gradient descent method during the establishment of the new test datum.

16. Process as claimed in claim 13, wherein confrontation between the test data and the solid orientation that the measuring datum represents comprises the establishment of difference data between successive test data and the solid orientation that the measuring datum represents.

17. Process as claimed in claim 13 wherein the capture, the confrontation and the establishment is repeated with successive measuring data.

* * * * *